United States Patent
Corder et al.

(10) Patent No.: US 10,296,978 B1
(45) Date of Patent: May 21, 2019

(54) CONNECTED HOME AND ALERT NOTIFICATIONS

(71) Applicant: Allstate Insurance Company, Northbrook, IL (US)

(72) Inventors: Bryan Keith Corder, Gurnee, IL (US); Robert H. Johnson, Hoffman Estates, IL (US); Regina Madigan, Mountain View, CA (US); Carolyn Parker, Libertyville, IL (US); Rothana Srey, Dekalb, IL (US); Nicholas A. Suizzo, Cody, WY (US); Sean P. Willett, Chicago, IL (US); Nan Zhang, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 809 days.

(21) Appl. No.: 14/707,678

(22) Filed: May 8, 2015

Related U.S. Application Data

(60) Provisional application No. 61/990,428, filed on May 8, 2014.

(51) Int. Cl.
  *G06Q 40/00* (2012.01)
  *G06Q 40/08* (2012.01)
(52) U.S. Cl.
  CPC .................. *G06Q 40/08* (2013.01)
(58) Field of Classification Search
  CPC .............................. G06G 40/00; G06G 40/08
  USPC ....................................................... 705/4, 35
  See application file for complete search history.

(56) References Cited

U.S. PATENT DOCUMENTS

| 8,749,381 | B1 * | 6/2014 | Maroney | G06Q 10/10 340/540 |
| 2002/0010599 | A1 * | 1/2002 | Levison | G06Q 30/02 705/4 |
| 2013/0144658 | A1 * | 6/2013 | Schnabolk | G06Q 40/08 705/4 |
| 2014/0136242 | A1 * | 5/2014 | Weekes | G06Q 40/08 705/4 |

OTHER PUBLICATIONS

Homeowners Encouraged to Ask Insurance Providers about Policy Credits for Lightning Protection Systems, PR Newswire Nov. 30, 2012: NA.*

* cited by examiner

*Primary Examiner* — Lalita M Hamilton
(74) *Attorney, Agent, or Firm* — Banner & Witcoff, Ltd.

(57) ABSTRACT

Systems, methods, apparatuses and computer-readable media for receiving data from one or more sensors associated with one or more home devices, such as appliances, home systems, etc. are presented. In some examples, the data may be used to determine whether the home device is operating within an expected range. The data may be used to identify abnormal operating conditions in a first home. Based on the identified abnormal operating conditions a root cause of the abnormal operating conditions may be determined. A message may be transmitted to at least one additional home. The message may include the root cause of the abnormal operating conditions occurring in the first home. The message may be used to alert other homes to current conditions so that they can take preventive action. The data may also be used to determine an insurance rate or premium for participating homes.

19 Claims, 8 Drawing Sheets

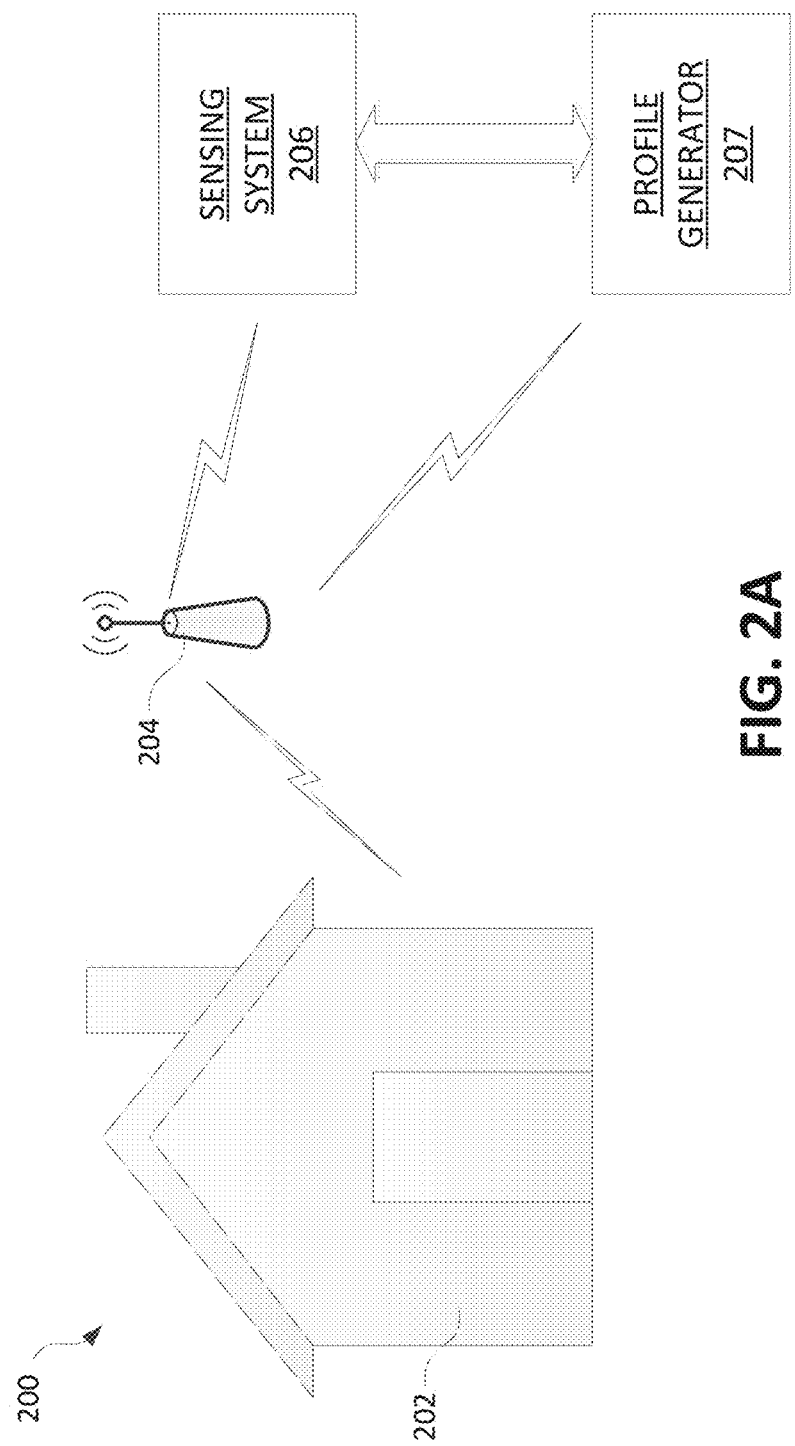

CONNECTED HOME AND ALERT NOTIFICATIONS

This application claims priority to and the benefit of U.S. Provisional Patent Application No. 61/990,428 filed on May 8, 2014. The above-identified application is hereby incorporated by reference herein in its entirety.

TECHNICAL FIELD

Aspects of the disclosure generally relate to monitoring and/or sensing of one or more home devices from one or more homes in a neighborhood. In particular, various aspects described herein relate to receiving data from one or more sensors associated with one or more home devices from one or more homes and using the data to determine insurance rates or premiums, discounts, incentives, and the like. The data may also be used to alert different homes in a neighborhood to any abnormal occurrences happening within any of the connected homes so that preventive actions may be initiated.

BACKGROUND

People are often looking for ways to protect their homes. People buy insurance for exactly that reason—to protect against unforeseen risks. In conventional arrangements, it may be difficult or impossible to know when a failure of a home device may occur that may lead to damage to the home, an insurance claims etc. In addition, homes located in the same neighborhood may be exposed to similar risks such as damage from weather events or neighborhood crime. For example, roof damage from a storm event on one home in a neighborhood may indicate potential damage of other roofs of homes in the same neighborhood. Without accurate information associated with a particular home or neighborhood of homes an insurance company might not be able to accurately assess neighborhood risk and the impact of such risk. This may result in an insurance premium that is based on a generic risk assessment, rather than a risk assessment tailored to the specific home in a specific neighborhood.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for receiving data from one or more sensors associated with one or more home devices, such as appliances, home systems, etc. from a plurality of homes. The data may be analyzed to identify abnormal operating conditions in a first home.

In an aspect of the disclosure, based on the identified abnormal operating conditions a root cause of the abnormal operating conditions may be determined. A message may be transmitted to at least one additional home. The message may include the root cause of the abnormal operating conditions occurring in the first home. The message may be used to alert other homes to current conditions so that they can take preventive action.

In an aspect of the disclosure, participating homes may receive incentive offers. The incentive offers may include insurance rate adjustments, cash back, additional insurance coverage, privileges such as automated claims processing, and other rewards. In an embodiment, information from the homes may be used to detect fraudulent claims in homes that are not monitored. In another embodiment, information from homes may be used to generate a heat map of notifications, which can assist in deploying adjusters or for tracking patterns.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 2A is a schematic diagram of an example sensing system according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
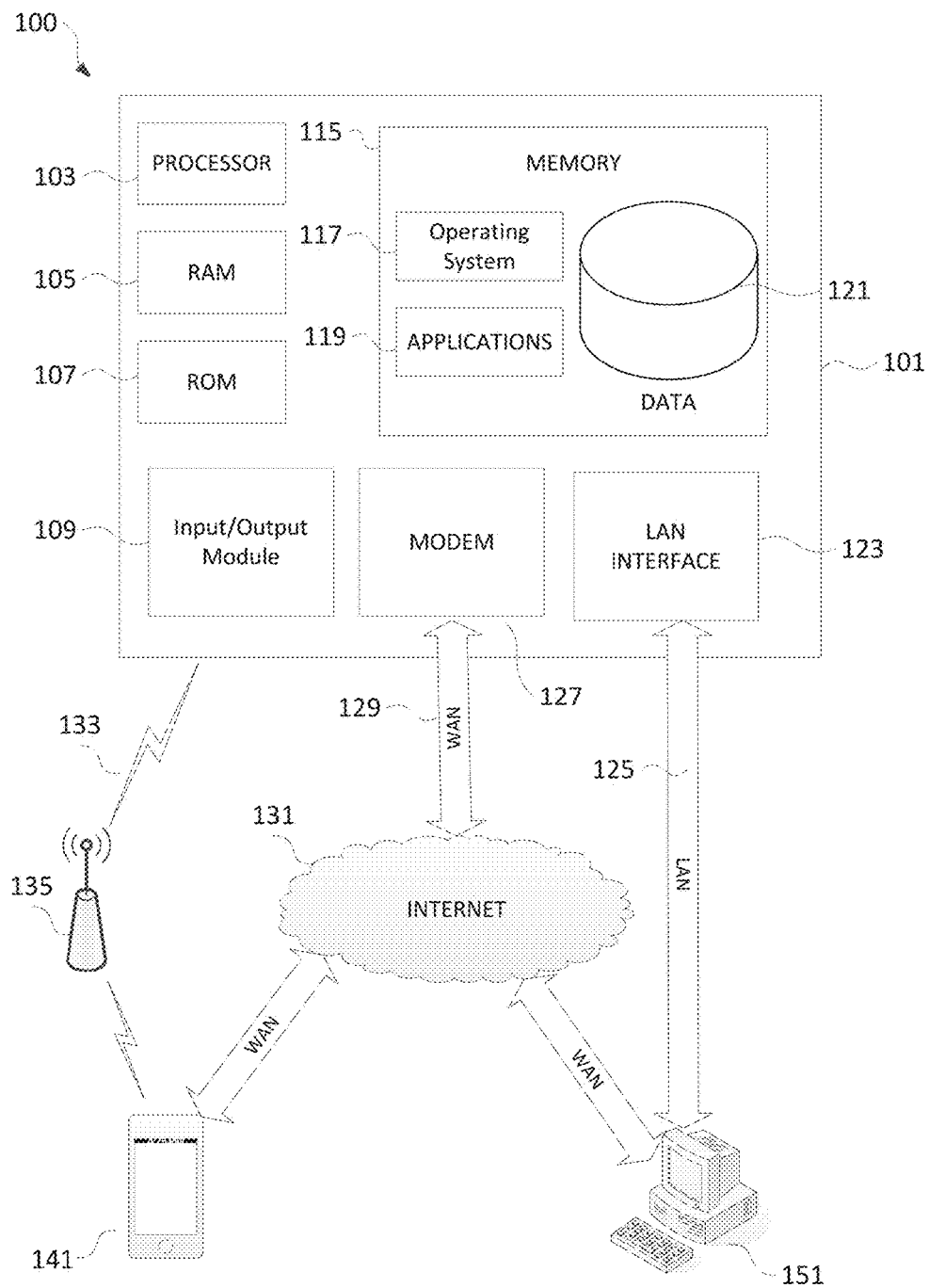
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output device 109, and memory 115. The computing device 101, along with one or more additional devices (e.g., terminals 141, 151) may correspond to any of multiple systems or devices, such as various servers or systems, such as a system or systems for sensing and/or monitoring aspects of one or more home devices, system or systems for determining a home profile or neighbored rating factor, system or systems for sensing and/or monitoring aspects of a vehicle or driving habits, and the like, configured as described herein for receiving data associated with one or more home devices, one or more vehicles, one or more health or lifestyle aspects, etc., to determine whether the operation of these devices is within an acceptable range, identify any potential issues or failures, identify or adjust insurance rates based on the received data, provide insurance incentives for improvement based on the data, etc. Such system or systems may communicate any sensed or determined data to other users for alerting them to current conditions to take preventive action.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a home device, vehicle, lifestyle aspect, etc., determine one or more aspects of operation of the device and/or one or more overall aspects of a customer's lifestyle and/or provide insurance rates and/or incentives based on the data.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the sensing or monitoring system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the sensing system 101 may include computer-executable instructions (e.g., home device characteristic data analysis, home profile data etc.) for receiving data associated with a home device of a user, analyzing the data to determine one or more aspects of the home device, and/or generating insurance rate, adjustment, incentive, etc. based on the data. Furthermore, one or more application programs 119 used by the sensing system 101 may include computer-readable instructions for determining a home profile or neighborhood rating factor which may be used to adjust insurance premiums. The application programs 119 may also be used to communicate any sensed or determined data to other users for alerting them to current conditions so that they can take preventive action. The application program 119 may also be used to assist in preventing fraudulent claims.

Additionally or alternatively, one or more application programs 119 used by the sensing system 101 may include computer-executable instructions (e.g. home device, vehicle and/or lifestyle data analysis, etc.) for receiving data associated with one or more aspects of a home device of a user, one or more aspects of a vehicle and/or driving characteristics of the user, and/or one or more aspects of the lifestyle of the user. The data may, in some examples, be used to identify insurance rates, adjustments, incentives, and the like.

The systems described herein may be used by an insurance company, financial institution or other entity to monitor one or more home devices, vehicles, driving characteristics, lifestyle characteristics, etc. of a user. Although many examples herein will be described as being used in conjunction with an insurance company, the systems and methods described herein may be used by or with other entities or types of entities without departing from the invention.

Figure 2B:
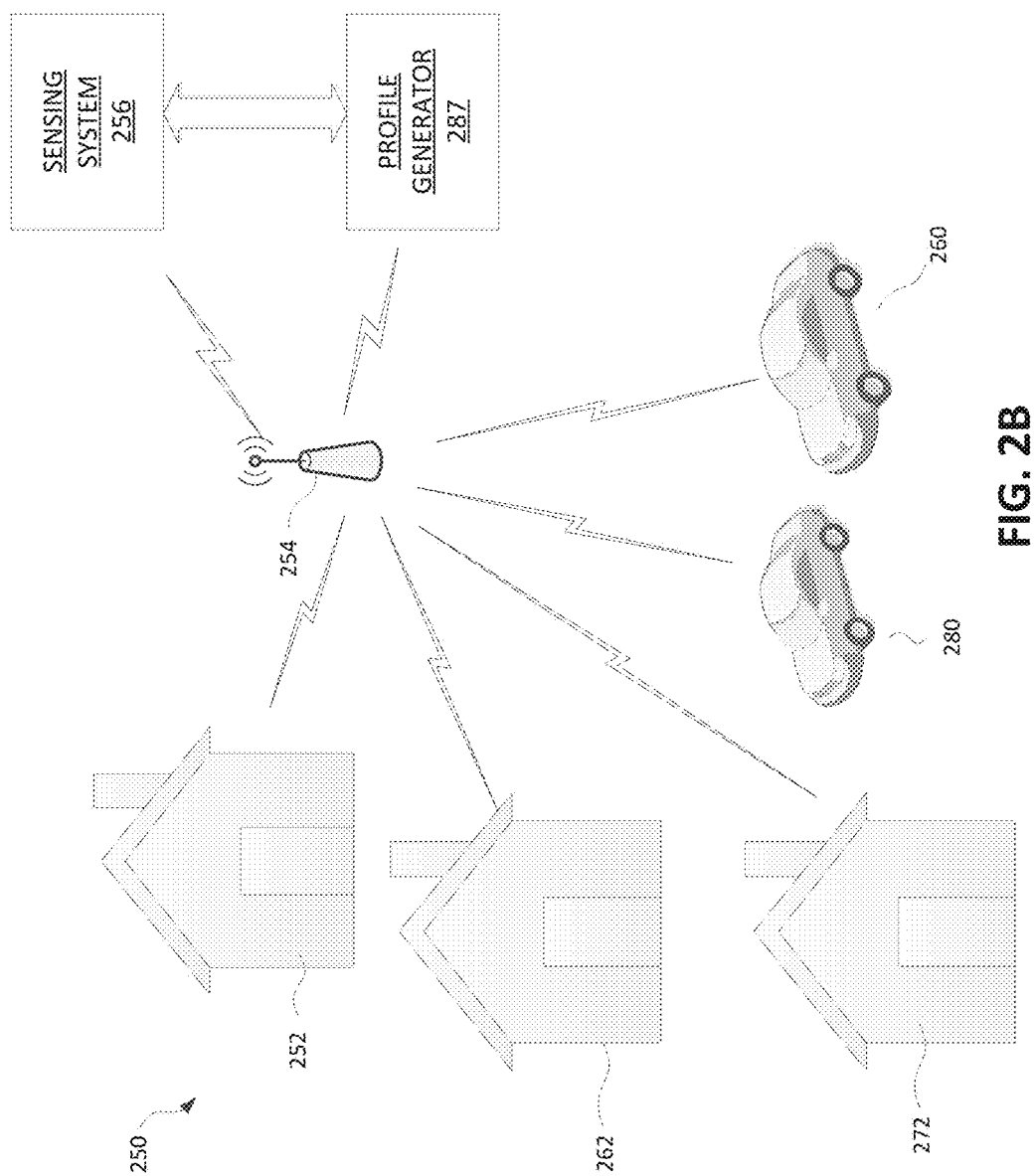
FIG. 2B is a schematic diagram of another example sensing system according to one or more aspects described herein.

In some arrangements, a sensing or monitoring system may be implemented by an entity. In some examples, the entity may be an insurance company. FIGS. 2A and 2B are schematic illustrations of sensing and/or monitoring system arrangements according to one or more aspects described herein. As shown in FIG. 2A, the arrangement 200 may include a home 202. The home generally includes a variety of systems, appliances, etc. that may be monitored by the sensing system described herein. For instance, one or more sensors or sensing devices may be arranged on or integrated into devices such as hot water heaters, refrigerators, washing machines, dryers, furnaces, air conditioning units, and the like. In some examples, sensors or other monitoring devices may be arranged on or integrated into paint, bricks or other building materials, and the like. Other home devices may include sensors or be monitored without departing from the invention.

In some examples, various types of sensors may be used with the sensing and/or monitoring system. For instance, power sensors, water sensors, heat or smoke sensing devices, and the like, may be used. In still other examples, "smart" materials may be used, such as smart paints, smart bricks, and the like, that may provide indications of wear or potential failure. Some examples of sensors that may be used in one or more systems described herein may include sensors manufactured by SMARTTHINGS.

The home 202 depicted in FIG. 2A may include a plurality of appliances and/or systems and one or more of the appliances and/or systems (e.g., devices) may be monitored by one or more sensing devices, as will be described more fully below. Signals from the one or more sensing devices may be transmitted to the sensing system 206 at an entity, such as an insurance company. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

In an aspect of the disclosure, sensing system 206 may log the time of day that events occur such as the time lights are turned on, doors are opened and closed, and the like. In addition, sensing system 206 may log activation times of appliances such as logging the starting time of an oven, stove or dishwasher. The time the appliance turns off may also be logged such that a duration time may be calculated for each appliance. In an embodiment, sensing system 206 may also log the opening and closing of doors or windows and the activation of security systems or the like.

In an aspect of the disclosure, sensing system 206 may transmit the stored information to profile generator 207 to determine a home profile for home 202. The determined home profile may include typical operations of home 202 such as appliance use, opening and closing of doors and windows, and activation of lights. In an embodiment, profile generator 207 may analyze data from the various home sensing devices. Profile generator 207 may determine based on analysis of hours or days of sensor data normal usage patterns for the home and/or the appliances found in the home. The determined normal usage patterns for the home may be used to generate a home profile for the home.

In an embodiment, a home profile may comprise a series of scores. The home profile may be determined based on losses associated with various perils. In an embodiment, various perils that may be scored include fire, brush fire, weather water, non-weather water, liability, theft, wind, hail, lightning, hurricane, and a miscellaneous category which captures new or risks not categorized above. Those skilled in the art will realize that additional categories or grouping of perils may be added based on property location or other external factors. In an embodiment, sensor data may be tied to various peril categories for which losses may occur. For example, use or non-use of an alarm system may be used to determine losses or potential losses for the theft peril. In another embodiment, sensors measuring appliance and/or utility usage may be used to determine losses or potential losses for the fire peril. Those skilled in the art will realize that sensor data from each monitored device may be applied to multiple different perils.

In an aspect of the disclosure, factors may be determined for each of the peril categories based at least in part on sensor data and/or normal operating conditions of the home. In an embodiment, the home profile may comprise a series of scores based one the calculated factors. The calculated home profile may be applied to each of the peril categories to determine an insurance premium rate.

In an embodiment, a home profile may comprise an overall rating score. The overall rating score may be determined at least in part by the number of sensors located in the home and the number of sensor activations. The home profile may also comprise, in part, the determined normal operating conditions of the home. In an embodiment, the home profile may be calculated along a sliding scale ranging in one embodiment between zero and five hundred. Those skilled in the art will realize that numerous other sliding scales with various ranges may also be used. In an embodiment, the home profile may be applied to each of the peril categories to determine an insurance premium rate. In another embodiment, the home profile may apply differently to each of the various perils to determine an insurance premium rate.

In an embodiment, the determined home profile for the home may be used for determining an insurance premium rate for the home. In an aspect of the disclosure, the determined home profile may be updated at some frequency by automatic review of new sensor data over a specified time period.

FIG. 2B illustrates another example sensing arrangement 250. Similar to the arrangement of FIG. 2A, the arrangement 250 of FIG. 2B includes a home 252 that may include a plurality of appliances and/or systems that may be monitored by one or more sensing devices. In addition, the arrangement 252 may include a vehicle 260. The vehicle 260 may include one or more sensing devices configured to monitor driving habits of a user. The data associated with the vehicle 260 may be transmitted to a sensing system 256, e.g., via wired or wireless communications. For instance, vehicle 260 may include one or more cameras and proximity sensors capable of recording additional conditions inside or outside of the vehicle. Internal cameras may detect conditions such as the number of the passengers in the vehicle and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving event data analysis. The external cameras and sensors may also be used to detect ambient conditions or weather events when parked such as in a home driveway. In addition, the vehicle sensors may detect motion around the vehicle parked at the home. Sensors on the car may also be able to detect or record a burglary in progress or other event occurring in view of the external cameras or sensors. The data may be transmitted to sensing system 256. In another embodiment, the operational sensors and the cameras and proximity sensors may store data within the vehicle, and/or may transmit the data to one or more external computer systems (e.g., a sensing system 300 in FIG. 3), as will be discussed more fully below.

The data transmitted to the sensing system 256 may be aggregated and some or all of the portions of the data may be used to identify and/or adjust insurance premiums or rates, provide insurance incentives, and/or provide discounts to the user. For instance, a user may be eligible for a discounted insurance premium if the user is willing to share the monitored or collected data with an entity, such as an insurance company. This data may then be used to modify or set insurance premiums or rates for the user (e.g., home insurance, vehicle insurance, and the like) and/or to more accurately assess risk associated with a user. Additionally or alternatively, the data collected may be aggregated with other data (e.g., historical data collected over an extended time period, other user monitored data, etc.) to further assess risk and/or set premiums or rates. The aggregated data may, in some examples, be sorted by locality (e.g., neighborhood, township, state, etc.) to assess risk by geographic location and set or adjust premiums or rates based on geographic location, as desired. In addition, portions of the data may also be shared with other homes in the same neighborhood. For instance, FIG. 2B illustrates additional homes 262 and 272 which along with home 252 may comprise homes in a common neighborhood. The neighborhood may be defined by a number of particular streets or addresses or even by zip codes. Homes located within the same neighborhood may share information in order to notify each other of present events. For example, if home 250 determines based on the sensor data that a burglary may be ongoing, a message may be transmitted to home 262 and home 272 to alert them to the potential danger and to have them take preventive measures such as turning on all exterior lights. In an embodiment, homes willing to share such data with an entity and with other homes may be eligible for discounted insurance premiums or other incentives.

FIG. 2B further illustrates an additional vehicle 280 which may also be associated with a particular home such as home 272. Vehicle 280 similar to vehicle 260 may transmit information to a base collection unit 254 or directly to a sensing system 256, such as a sensing system used by an entity (e.g., an insurance company or provider). Vehicle data 280 along with home data 272 and 262 may be used or aggregated to determine or adjust the insurance premiums or rates of the individual homes. In another embodiment, vehicle data 280 along with home data 272 and 262 may be used or aggregated to determine a neighborhood rating factor to be applied to the insurance premiums or rates of multiple homes within a neighborhood.

Figure 3:
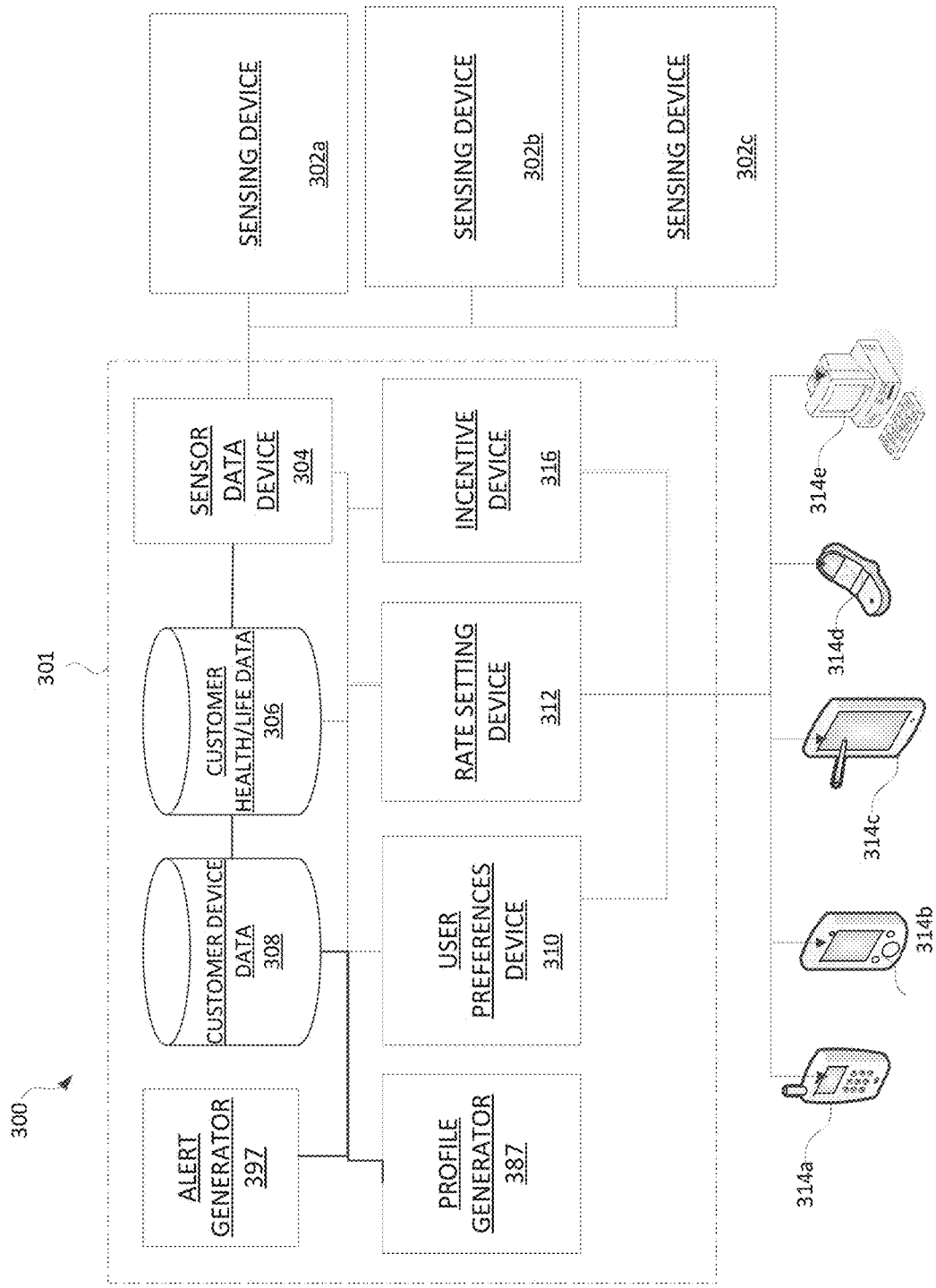
FIG. 3 is an example sensing system according to one or more aspects described herein.

FIG. 3 illustrates one exemplary sensing system 300. Each component of sensing system 300 may include a computing device (or system) having some or all of the structural components described above for computing device 101. In some arrangements, some or all of the components of system 300 may be housed in a single physical device. Alternatively, some or all of the components may be housed in separate physical devices.

Sensing system 300 may be associated with an entity 301. For instance, system 300 may be implemented by an entity 301, such as an insurance company. In other examples, system 300 may be implemented by various other types of companies, universities, government entities, and the like. Several examples discussed herein will be described in the context of an insurance company. However, nothing in the disclosure should be viewed as limiting the systems, methods, computer-readable media, and the like, described herein to use with insurance companies.

Sensing system 300 may include a plurality of sensing devices 302a-302c. Sensing devices 302a-302c may be a variety of types of devices and may be used to monitor or sense one or more characteristics of a home device, such as an appliance, system, etc., vehicle, and the like. For instance, sensing devices 302a-302c may include power sensors, float switches, moisture sensors, power sensors or monitors, wear indicating devices, speed sensors, and the like. In other examples, sensing devices 302a-302c may include devices for sensing temperature, sewage backup, natural gas, propane, etc., air quality (e.g., carbon monoxide, etc.), air flow quality, water flow, and the like. Various other types of sensing devices and/or characteristics may be monitored via sensing devices 302a-302c.

In some arrangements, one or more of sensing devices 302a-302c may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, and the like, may be monitored. Various other appliances and/or systems may be monitored without departing from the invention.

In some examples, one or more of sensing devices 302a-302c may be connected to or in communication with systems of a vehicle. For instance, one or more of the sensing devices 302a-302c may be configured to detect ambient conditions or weather events when the vehicle is parked such as in a home driveway. In addition, vehicle sensing devices may detect motion around a parked vehicle at a home. The data may be transmitted to sensing system 256. In another embodiment, the sensing devices may store data within the vehicle, and/or may transmit the data to one or more external computer systems as will be discussed more fully below.

Although sensing system 300 includes three sensing devices 302a-302c, system 300 may include more or fewer sensing devices without departing from the invention. Further, in some examples, each sensing device may be a different type of device and/or may be configured to monitor different characteristics of the home device (e.g., sensing device 302a detects moisture while sensing device 302b detects power consumption) or vehicle. Additionally or alternatively, each sensing device 302a-302c may be connected to or in communication with a different home device or vehicle, or multiple sensing devices 302a-302b may be connected to or in communication with a single home device or vehicle such that multiple, different characteristics of the home device or vehicle are being monitored (e.g., simultaneously). This may permit additional and/or more accurate information to be collected about the home device. Various combinations of the above-described arrangements may also be used without departing from the invention.

Signals and/or data from the sensing devices 302a-302c may be received by sensing system 300. For instance, signals and/or data may be transmitted from sensing devices 302a-302c to system 300 via wired or wireless transmission. In some examples, data and/or signals may be transmitted to a base unit for collection prior to transmission to system 300 or entity 301 associated with the system. In other examples, data and/or signals may be transmitted directly from each sensor 302 to system 300 or entity 301.

Signals and/or data from the sensing devices 302a-302c may be received by a sensor data device 304. Sensor data device 304 may include one or more computing devices containing many or all of the hardware and/or software components of the computing device 101 in FIG. 1. Sensor data device 304 may include hardware, software and/or network components configured to receive and/or transmit information to and/or from various computing devices, devices, databases, sensors, and the like.

Sensor data device 304 may be configured to perform a set of functions within the sensing system 300. For instance, sensor data device 304 may collect data and/or signals received from one or more sensing devices 302a-302c and may include one or more algorithms which may be executed by one or more software applications running on generic or specialized hardware within sensing system 300 to determine whether data is within a predefined range. For instance, sensor data device 304 may identify signals or data that are outside a predefined range (e.g., a normal or typical operating range) and, responsive to determining that the data is outside the predefined range, transmit an alert to a user identifying the potential issue. In some examples, the predefined range may be set, such as by a system administrator. In other examples, the predefined range may be based on historical data of the user or similar devices being monitored. In some examples, the historical data may be stored in a database, such as customer device database 308, as will be discussed more fully below.

In some arrangements, sensor data device 304 may aggregate data received from sensing devices 302a-302c for later use, as will be discussed more fully below.

Data received from sensors 302a-302c may be stored in customer device database 308. Customer device database may be organized in any of several different manners. For example, a table in the customer device database 308 may include a listing of various users, home devices associated with each user, historical data of the home devices, current or recent weather data, historical weather data, vehicle and/or driving data of the users, geographic location of users, and the like.

In some examples, customer device database 308 may also include historical data collected from users without the use of sensors. For example, customer device database 308 may include information provided by users, such as information associated with appliances, vehicles, home systems, etc. For instance, upon purchase of an appliance (e.g., stove, refrigerator, water heater, etc.) a user may provide information regarding the manufacturer, model, serial number, year of purchase or manufacture, amount paid, etc. for the appliance. Accordingly, as users add information for each appliance, system or vehicle, a catalog of device information may be maintained by the customer device database 308. This catalog of information may be used to track the age of appliances, systems, vehicles, etc., determine or assess risk associated with those appliances, systems or vehicles, identify opportunities for improvement (e.g., energy efficiency improvement) and the like.

In some examples, a radio frequency identifier (RFID), quick response (QR) code, bar code, or other data element may be applied to the appliance, system or vehicle to simplify tracking and/or identification of the appliance. For instance, if a repair is made to an appliance, the repair information may be provided to the system and may be input to the system by scanning the QR code, bar code, etc. and updating the information associated with that appliance, system or vehicle.

The information stored in customer device database 308 may also be used to alert users of recalls associated with one or more appliances, systems or vehicles within the system. For instance, recall information may be transmitted to the system 300 and the system may identify any devices matching the recall information. Accordingly, an alert may be transmitted to the user associated with that device.

In still other examples, customer device database 308 may include historical customer information gathered from clients without the use of sensors. For instance, historical data from customers regarding incidents or damage to the home, appliances, system, vehicle, etc. may be obtained, such as from previous insurance claim information, and stored to further aid in assessing risk and setting or adjusting insurance rates or premiums.

Sensing system 300 may further include customer health/life data 306. Customer health/life data may be received from the customer or user and may include information regarding the general health and/or lifestyle of the user. For instance, it may include healthy eating habits of the user, exercise habits of the user, general wellness information (e.g., whether the user visits the doctor on at least an annual basis, etc.). The information may be received by the system via one or more computing devices, such as computing devices 314a-314e. For instance, a user may input health and/or life data via a smart phone 314a, personal digital assistant (PDA) 314b, tablet computer 314c, cell phone 314d or computer terminal 314e. Various other types of computing devices may be used without departing from the invention. In some examples, data may be stored in a mobile device application and transmitted from the application to the system 300. In still other examples, some data, such as exercise data, may be collected via one or more sensors (e.g., accelerometers, heart rate monitors, etc.) that are connected to the system. For instance, a user may have a device that monitors pace, speed, heart rate, and the like. This information may be uploaded from the user device to the system for use in determining and/or adjusting insurance rates or premiums, assessing risk associated with the user, and the like.

Sensing system 300 may further include a user preferences device 310. User preferences device 310 may be implemented in hardware and/or software configured to perform a set of functions within the sensing system 300. For instance, user preferences device 310 may receive and/or store one or more customer or user preferences associated with the sensing devices 302a-302c and/or the system in general. For example, a user may monitor one or more systems, appliances, vehicles, etc. However, the user may desire to only transmit a portion of the collected data to the system. Accordingly, a user may set up a user preference identifying the devices, appliances, systems and/or vehicles for which the system may monitor and/or receive data. Thus, a user may desire to only provide data associated with one or more home systems and not provide data associated with life or vehicle. In another example, a user may desire to provide all of the home device data, vehicle data and life data. Various other examples and combinations may be used without departing from the invention. In some examples, the entity may provide additional incentives, discounts, etc. based on the number of devices and/or data sets being received by the entity. For instance, if the user preferences indicate that all device data may be transmitted to the entity, that user may receive more incentives and/or discounts than a user provide only a portion of the collected data.

Sensing system 300 may further include a profile generator 387. Profile generator 387 may be implemented in hardware and/or software configured to perform a set of functions within the sensing system 300. For instance, profile generator 387 may analyze signals and/or data from the sensing devices 302a-302c that were stored in sensor data device 304. Profile generator 387 may determine normal operating conditions for a home based on analysis of the sensor data. Based on the determined normal operating conditions, profile generator 387 may determine a home profile for the home.

In an embodiment, the determined home profile may be used for determining an insurance premium rate for the home. In an aspect of the disclosure, the determined home profile may be updated at some frequency by automatic review of new sensor data over a specified time period.

Sensing system 300 may further include a rate setting device 312. Rate setting device 312 may be implemented in hardware and/or software configured to perform a set of functions within the sensing system 300. For instance, rate setting device 312 may determine and/or adjust insurance rates or premiums based on the data collected by or stored within system 300. Rate setting device 312 may analyze the data to assess risk associated with one or more users, devices, geographic areas, etc. and may use that information to provide insurance adjustments or determine rates or premiums for users that may include customers or potential customers of the entity (e.g., the insurance company). In some examples, rate setting device 312 may be in communication with or connected to other systems associated with the entity to aid in assessing risk, determining rates, etc.

Sensing system 300 may further include an incentive device 316. Incentive device 316 may be implemented in hardware and/or software configured to perform a set of functions within the sensing system 300. For instance, incentive device 316 may identify one or more rebates, discounts, incentives, etc. to provide to a user based on the data collected by or stored within the system 300. For instance, if the collected data indicates that a water heater is likely to fail (e.g., based on an age of the water heater, detected corrosion within the water heater, etc.) the system may generate an incentive for the user to replace the water heater. For instance, the system may identify a 5% discount on home owners insurance for the user if the water heater is replaced within a predetermined period of time.

Sensing system 300 may further include an alert generator 397. Alert generator 397 may be implemented in hardware and/or software configured to perform a set of functions within sensing system 300. For instance, alert generator 397 may transmit messages to other homes or entities giving details of any abnormal operating conditions or events happening in a particular home. Such messages may enable receiving homes of the alerts to take preventive action to prevent the event from effecting additional homes.

Figure 4:
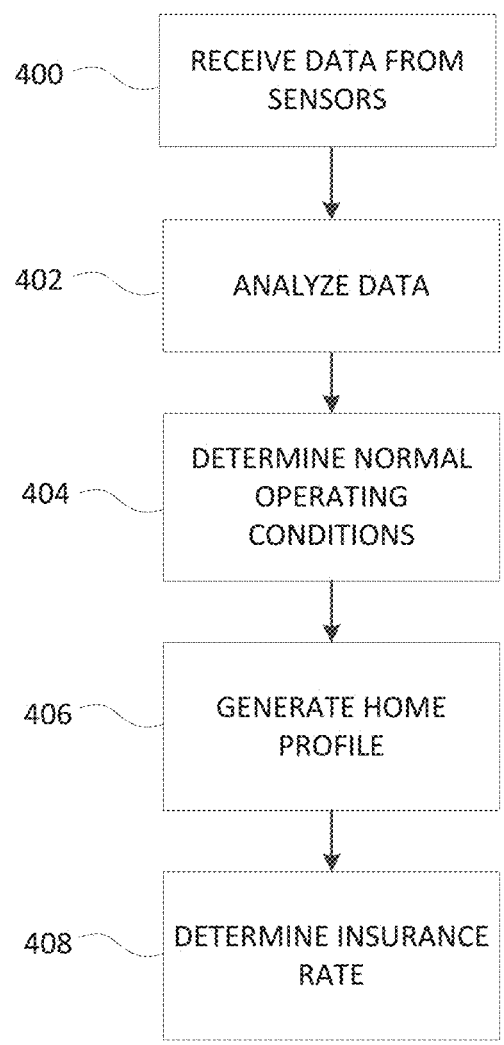
FIG. 4 is a flow chart illustrating one example method of implementing a sensing system according to one or more aspects described herein.

FIG. 4 illustrates one example method of implementing a sensing system according to one or more aspects described herein. In step 400, data is received from a sensor. In some examples, data may be received from a plurality of sensors. The plurality of sensors may be associated with one home device or with a plurality of home devices. In step 402, data is analyzed to determine whether the received data is outside of a predefined threshold. For instance, a determination may be made as to whether the received data indicates that the device is operating outside of a typical range of data.

In step 404, a determination may be made as to whether the plurality of sensors monitoring the various home devices indicates that the home is operating under normal operating conditions. In an embodiment, normal operating conditions may denote that all monitored devices in the home are operating correctly with no warnings or within predefined thresholds. As the devices may be monitored for longs periods, historical information may be used to determine trends in a home so as to recognize normal use of monitored devices in that particular home. For instance, a garage door may be opened daily around the same time indicating that someone may be going to work or school. Such device activation at the same time daily may be part of the normal operating conditions of the home and would not indicate any problems or abnormal conditions. However, a garage door activation at 3:00 am could with other sensor data indicate that a home may not be operating under normal conditions. Such device activation along with other collected sensor data may indicate a burglary is in progress and that law enforcement should be alerted. If abnormal operating conditions are detected, a notification may also be transmitted to the home owner or user via email, phone, SMS, and the like. The notification may be sent to a computing device of the user, such as a mobile device or user interface arranged in a vehicle.

In step 406, a home profile may be generated based on the determined normal operating conditions of the home. In step 408, the home profile (and, in some instances, other data) may be used to set or adjust one or more insurance rates or premiums. For instance, the home profile may be used to more accurately assess risk associated with a home and may be used to adjust or determine an insurance rate or premium based on this assessed risk. As discussed above, the more devices being monitored by the sensing system, the more accurate the home profile and therefore the more accurately risk may be assessed and premium adjusted.

In some arrangements, users may be notified of the potential rate or adjustment prior to the rate or adjustment taking effect. The user may then have an opportunity to take action in order to further adjust the rate. For instance, the user may replace the device likely to fail in order to avoid an increase in insurance premium. In some examples, the user may be provided with a time limit in which to take action prior to the rate or adjustment going into effect. For instance, the user may be notified that if the device is not repaired or replaced within, for example, 30 days, 60 days, etc., the new or adjusted rate will go into effect. In some arrangements, upon replacement of the device, the entity may hold the adjustment of the rate until sufficient data is collected to determine that the device has been replaced and is functioning within an acceptable range. This may provide additional security to the insurance company to avoid fraudulent indications of replacement of devices.

Figure 5:
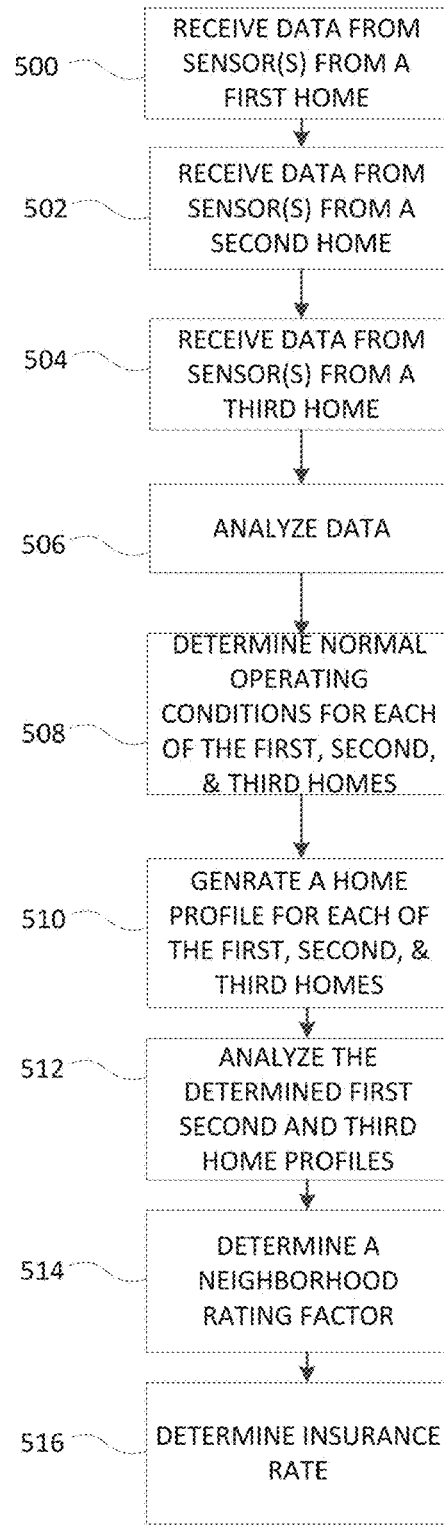
FIG. 5 is a flow chart illustrating another example method of implementing a sensing system according to one or more aspects described herein.

FIG. 5 illustrates another example implementation of a sensing system according to one or more aspects described herein. In step 500, data may be received from one or more sensors from a first home. For instance, data may be received from a plurality of sensors associated with one home device or from sensors associated with a plurality of home devices in the first home. In step 502, data may be received from one or more sensors from a second home. For instance, data may be received from a plurality of sensors associated with a plurality of home devices in the second home. In step 504, data may be received from one or more sensors from a third home. For instance, data may be received from a plurality of sensors associated with a plurality of home devices in the third home. Those skilled in the art will realize that any number of homes may provide sensor data regarding devices in that respective home to the sensing system. The sensing system may collect information regarding a number of homes in a particular neighborhood or zip code.

In step 506, the received data may be analyzed to extract information that may be used in additional analysis and/or determinations. For instance, data may be processed to determine whether the plurality of sensors monitoring the various home devices in the first, second, and third homes indicate that each of the homes is operating under normal operating conditions. The analysis may be completed for each home separately or at the same time at a central sensing unit.

In an embodiment, normal operating conditions may denote that all monitored devices in a home are operating correctly with no warnings or within predefined thresholds. As the devices may be monitored for longs periods, historical information may be used to determine trends in a home so as to recognize normal outputs or setting for the monitored devices in that particular home. For instance, the temperature of a home may be maintained in a range between 68-72 degrees Fahrenheit throughout a particular time of year. Operating within the 68-72 degrees Fahrenheit temperature range for a first home may indicate a normal operation condition of that first home. However, if the temperature of the first home is altered or changed such that the home is maintained at 60 degrees Fahrenheit for a predetermined period of time it may indicate that the first home is operating in an abnormal operating condition which may indicate that a problem has occurred with the heating unit or that the owner is not currently occupying the home (i.e. on vacation etc.). The temperature information may be combined with other sensor data to determine an overall normal operating condition for the particular home.

If abnormal operating conditions are detected in the home, a notification may be transmitted to the home owner or user via email, phone, SMS, and the like. The notification may be sent to a computing device of the user, such as a mobile device or user interface arranged in a vehicle.

The received sensor information for each home along with any stored historical data for each home may be analyzed to determine normal operating conditions for each of the first, second, and third homes.

In step 510, a home profile for each of the first, second, and third homes may be generated based on the determined normal operating conditions of each of the homes. In step 512, the home profiles (and, in some instances, other data) may also be analyzed. In an embodiment, a neighborhood rating factor may be determined based on the analysis of the home profile in step 512.

In an embodiment, a neighborhood rating factor may be determined based on an aggregation of home profiles found in a particular area such as home profiles found in a particular zip code or other geographical boundary. In one embodiment, a neighborhood rating factor may be determined on a street by street basis for various neighborhoods.

In step 516, the neighborhood rating factor may be used to set or adjust one or more insurance rates or premiums for the homes located in that neighborhood. In an embodiment, the neighborhood rating factor may be applied to each of the peril categories to determine an insurance premium rate for a neighborhood.

In an embodiment, the neighborhood rating factor may be used to more accurately assess risk associated with a home and may be used to adjust or determine an insurance rate or premium based on this assessed risk. In some arrangements, the users may be notified of the potential rate or adjustment prior to the rate or adjustment taking effect. The user may then have an opportunity to take action in order to further adjust the rate.

Figure 6:
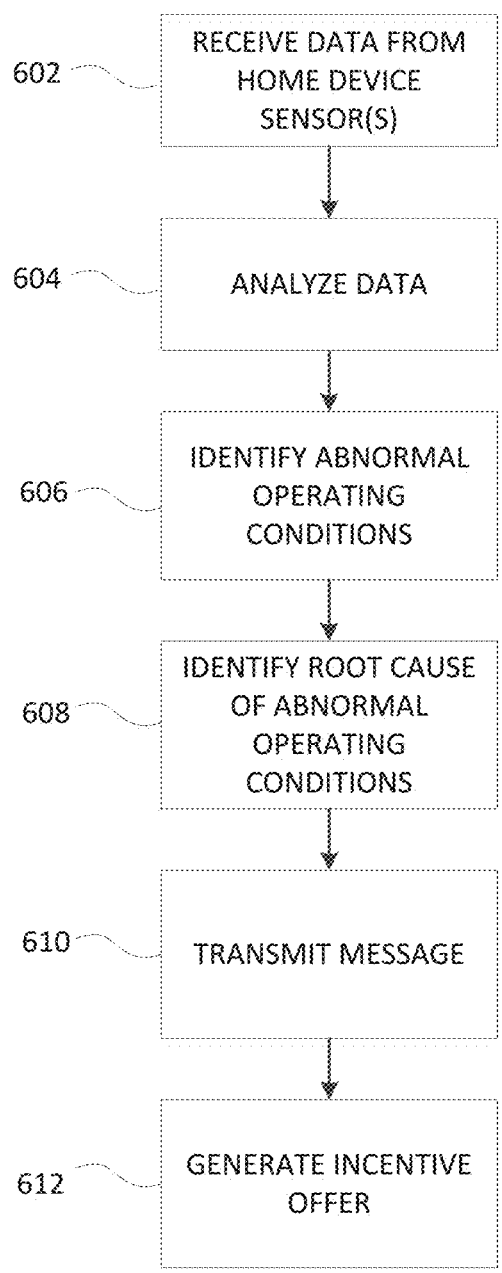
FIG. 6 is a flow chart illustrating yet another example method of implementing a sensing system according to one or more aspects described herein.

FIG. 6 illustrates another example implementation of a sensing system according to one or more aspects described herein. In step 602, data is received from one or more sensing devices associated with a home device located in a first home. The data may be received from multiple sensors and/or multiple devices. For instance, data may be received from a first home device which may include one of a water heater, refrigerator, furnace, washing machine, dryer, and dishwasher. In another embodiment data may be received from a second home device which may include one of a light switch, roof monitor, smoke detector, sump pump, and home security system.

In step 604, the received data for a first home may be analyzed. The analysis may be used to determine whether the plurality of sensors monitoring the various home devices indicates that the home is operating under normal operating conditions. In an embodiment, normal operating conditions may denote that all monitored devices in the home are operating correctly with no warnings or within predefined thresholds. As the devices may be monitored for longs periods, historical information may be used to determine trends in a home so as to recognize normal use of monitored devices in that particular home. For instance, rain detected by a roof or shingle monitor may indicate a normal operating condition for a home. However, hail as indicated or detected by a roof or shingle monitor (i.e. pressure sensor) may indicate an abnormal operating condition for the home (step 606). If abnormal operating conditions are detected, a notification may also be transmitted to the home owner or user via email, phone, SMS, and the like. The notification may be sent to a computing device of the user, such as a mobile device or user interface arranged in a vehicle.

The abnormal operating condition may be verified by weather data for which a sensing unit may be receiving real-time reports. In step 608, a root cause of the abnormal operating condition may be identified. In an embodiment, an insurance claim may be automatically initiated based on the identified abnormal operating conditions of the first home.

In step 610, a message may be transmitted to least one additional home. In an embodiment, the at least one additional home may comprise a second home that is adjacent to the first home. In another embodiment, the at least one additional home may comprise a second home and a third home, the second and third home located in the same neighborhood as the first home.

The message may include the identified root cause of the abnormal operating conditions in the first home. The received message at the additional home may enable the additional home owner to take preventive measures such as starting roof panels to protect against hail damage. In another embodiment, the message may be transmitted to safety personal.

In step 612, an incentive offer may be generated and applied to an insurance premium associated with the first home. In another embodiment, the incentive offer may include a reduction in an insurance rate of the first home.

Figure 7:
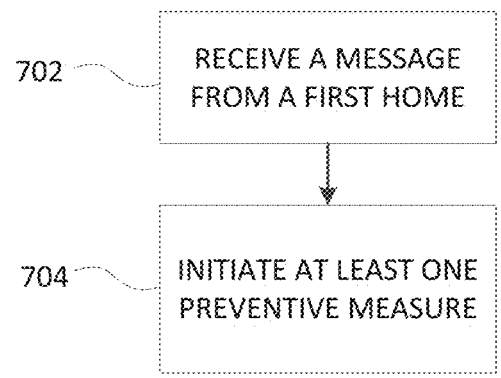
FIG. 7 is a flow chart illustrating still another example method of implementing a sensing system according to one or more aspects described herein.

FIG. 7 illustrates yet another example method of implementing a sensing system according to one or more aspects described herein. In step 702, a first home may receive a message from a second home which may be located in the same neighborhood as the first home. The message received in the first home may include an identified root cause of abnormal operating conditions occurring in the second home. In step 704, the received message at the first home may enable the first home to take preventive measures such as starting roof panels to protect against potential hail damage or turning on lights to prevent a burglary. The second home may receive an incentive offer for participating in the program and transmitting the message. The incentive offer may include an insurance rate adjustment, cash back, additional insurance coverage, privileges such as automated claims processing, and other rewards. The system may allow for a first home in a neighborhood to notify other homes in the neighborhood of present events. In an embodiment, information from the homes may be used to detect fraudulent claims in homes that are not monitored and which submit claims. In another embodiment, information from homes may be used to generate a heat map of notifications, which can assist in deploying adjusters or for tracking patterns.

Provided below are various example arrangements of the sensing systems described herein and one or more implementations of such systems. The arrangements described below are merely some examples of systems and implementations, and nothing in the examples should be construed as limiting the invention to only those examples. Rather, various other systems and implementations may be used without departing from the invention.

In one example, data may be received from one or more sensors in communication with or connected to a water line on a refrigerator. In some examples, the sensors may monitor the condition of the water line to determine an approximate age or likelihood of failure of the water line. For instance, a sensor may monitor an amount of flow through a water line (e.g., reduced flow may indicate buildup in the water line which may indicate an age of the water line or likelihood of failure). In another example, a sensor may monitor the flexibility or brittleness of the water line to determine whether the water line material has deteriorated, thus increasing a likelihood of failure. Sensors may transmit this data to the system for analysis and/or aggregation with other types of data to determine a likelihood of failure and/or an insurance rate. In some examples, the user may be offered a rebate, lower insurance rate, or other incentive to replace the water line prior to failure in order to avoid the failure.

Various other sensing arrangements of one or more appliances, systems, etc. may be used without departing from the invention.

The systems described herein provide various advantages. For instance, monitoring of one or more home devices, vehicle or driving characteristics and/or health or lifestyle information may aid in identifying potential issues. For instance, monitoring of various systems, etc. may provide an early warning of a potential failure or early warning of an actual failure. For instance, the monitoring system may detect moisture in a home (e.g., a broken pipe, etc.) in which the home owners are away. In some examples, the system may alert the home owner who may then have someone shut off the water in order to minimize the damage. In another example, a moisture sensor may detect a small amount of moisture and alert the user before the user would have detected the moisture himself. These early warning systems may reduce or eliminate damage.

Further, monitoring of various driving characteristics or health/lifestyle characteristics may raise awareness. For instance, a user may be unaware that he or she tends to exceed the speed limit when driving. In another example, a user may be unaware that he or she uses his or her mobile device while driving as often as he or she does. Accordingly, monitoring these aspects and notifying the user of the characteristics may raise awareness and cause the user to make safer or healthier decisions.

Further still, the systems described herein may be used with a variety of sensors or sensing devices. In some examples, the user may be able to install the sensors themselves without any additional assistance. Some sensors may be relatively inexpensive which may be another incentive for users to install one or more sensors or monitoring devices.

In addition, a user may select or determine the data that is made available to any entity (e.g., an insurance company) implementing the system. Accordingly, if a user desires to have the data collected in order to monitor his or her home, vehicle, lifestyle, etc. without providing the data to any outside entity, he or she may do so. In another example, a user may choose to provide a portion of the collected data to the entity. The entity may then provide increasing incentives for users who provide more information (e.g., the more data provided to the entity, the greater the incentive or benefit to the user from the entity).

The systems, apparatuses, computer-readable media and methods described above may further provide for increased accuracy in identifying risk associated with a home, user, etc. Accordingly, one or more insurance rates, premiums, and the like, may be adjusted based on this more accurate risk.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A computer, comprising:
a processor; and
a memory, the memory storing computer-readable instructions, which when executed by the processor cause the computer to:
receive at least one signal having first data from a first sensing device, the first sensing device being in communication with a first home device located in a first home;
receive at least one signal having second data from a second sensing device, the second sensing device being in communication with a second home device located in the first home;
detect abnormal operating conditions in the first home, based on analyzing the first data and the second data received, respectively, from the first sensing device and the second sensing device;
determine, from the abnormal operating conditions detected in the first home based on the analysis of the first data and the second data received, respectively, from the first sensing device and the second sensing device, a root cause of the abnormal operating conditions;
transmit a first message to a computing device of an individual associated with at least one additional home, the first message including the root cause of the abnormal operating conditions detected in the first home based on the analysis of the first data and the second data received, respectively, from the first sensing device and the second sensing device, wherein the at least one additional home is located within a predetermined distance from the first home; and
generate, based on the analysis of the first data and the second data received, respectively, from the first sensing device and the second sensing device, an incentive offer to be applied to an insurance premium associated with the first home.

2. The computer of claim 1, wherein the first home device is one of a: water heater, refrigerator, furnace, washing machine, dryer, and dishwasher.

3. The computer of claim 1, wherein the second home device is one of a: light switch, roof monitor, smoke detector, sump pump, and home security system.

4. The computer of claim 1, wherein the at least one additional home comprises a second home adjacent to the first home.

5. The computer of claim 1, wherein the at least one additional home comprises a second home and a third home, the second and the third home located in the same neighborhood as the first home.

6. The computer of claim 1, wherein the instructions further cause the computer to automatically initiate an insurance claim, based on the abnormal operating conditions detected in the first home.

7. The computer of claim 1, wherein the instructions further cause the computer to transmit a second message to a computing device of a home owner of the first home, the second message notifying the home owner of the abnormal operating conditions detected in the first home.

8. The computer of claim 1, wherein the instructions further cause the computer to transmit a third message to a computing device associated with safety personnel, the third message notifying the safety personnel of the abnormal operating conditions detected in the first home.

9. The computer of claim 1, wherein the incentive offer to be applied to an insurance premium associated with the first home includes a reduction in an insurance rate of the first home.

10. The computer of claim 1, wherein the first message comprises at least one of an email message, a phone message, and a short message service (SMS) message.

11. The computer of claim 1, wherein the instructions further cause the computer to:
calculate, based on the analysis of the first data and the second data received, respectively, from the first sensing device and the second sensing device, a plurality of scores; and
generate, based on the calculated plurality of scores, a home profile.

12. A method, comprising:
receiving at least one signal having first data from a first sensing device, the first sensing device being in communication with a first home device located in a first home;
receiving at least one signal having second data from a second sensing device, the second sensing device being in communication with a second home device located in the first home;
detecting abnormal operating conditions in the first home, based on analyzing the first data and the second data received, respectively, from the first sensing device and the second sensing device;
determining, from the abnormal operating conditions detected in the first home based on the first data and the second data received, respectively, from the first sensing device and the second sensing device, a root cause of the abnormal operating conditions;
transmitting a first message to a computing device of an individual associated with at least one additional home, the first message including the root cause of the abnormal operating conditions detected in the first home based on the first data and the second data received, respectively, from the first sensing device and the second sensing device, wherein the at least one additional home is located within a predetermined distance from the first home; and
generating, based on the first data and the second data received, respectively, from the first sensing device and the second sensing device, an incentive offer to be applied to an insurance premium associated with the first home.

13. The method of claim 12, further comprising automatically initiating an insurance claim, based on the abnormal operation conditions detected in the first home.

14. The method of claim 12, further comprising transmitting a second message to a computing device of a home owner of the first home, the second message notifying the home owner of the abnormal operation conditions detected in the first home.

15. The method of claim 12, further comprising transmitting a third message to a computing device associated with safety personnel, the third message notifying the safety personnel of the abnormal operation conditions detected in the first home.

16. The method of claim 12, wherein the incentive offer to be applied to an insurance premium associated with the first home includes a reduction in an insurance rate of the first home.

17. The method of claim 12, wherein the at least one additional home comprises a second home adjacent the first home.

18. The method of claim 12, wherein the first message comprises at least one of an email message, a phone message, and a short message service (SMS) message.

19. The method of claim 12, further comprising:
calculating, based on the analysis of the first data and the second data received, respectively, from the first sensing device and the second sensing device, a plurality of scores; and
generating, based on the calculated plurality of scores, a home profile.

* * * * *